Patented June 2, 1925.

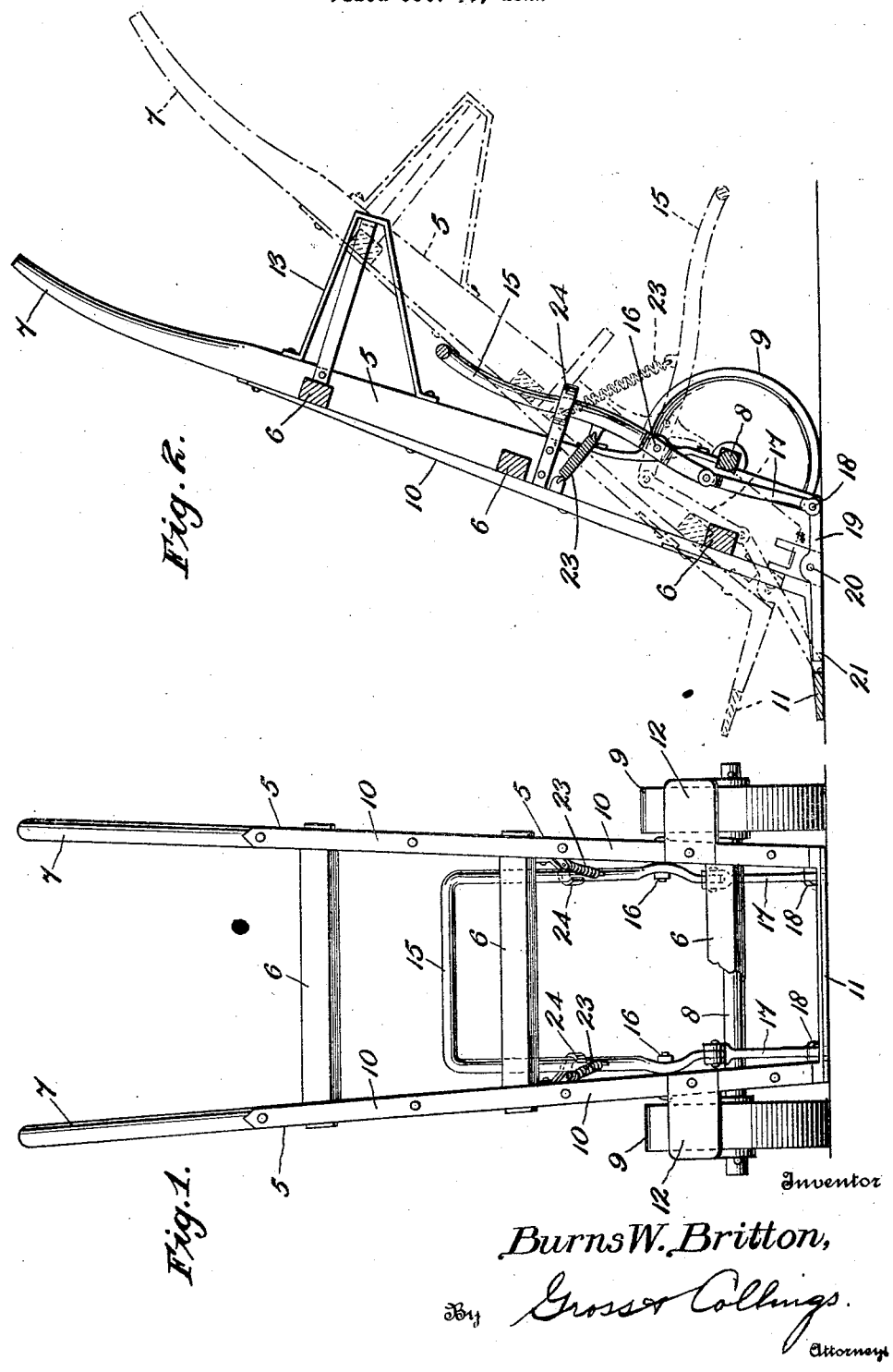

UNITED STATES PATENT OFFICE.

BURNS W. BRITTON, OF OREGON CITY, OREGON.

TRUCK ATTACHMENT.

Application filed October 30, 1922. Serial No. 597,969.

*To all whom it may concern:*

Be it known that I, BURNS W. BRITTON, a citizen of the United States, residing at Oregon City, in the county of Clackamas and State of Oregon, have invented certain new and useful Improvements in Truck Attachments, of which the following is a specification.

This invention relates to attachments for hand trucks and has for one of its objects to provide an attachment for facilitating the loading and initial starting of the truck after it is loaded.

A further object of the invention is to provide an attachment of the class described which may be readily secured to the body or frame of the truck and which may be operated by means of the foot of the truck operator, thereby leaving his hands free for grasping the handles of the truck.

A still further object of the invention is to provide a device of the character described which will be simple in construction, comparatively inexpensive to manufacture and which may be readily attached to new trucks or to those which are already in use and which will occupy comparatively little space.

With the above and other objects in view which will appear as the description proceeds, the invention consists in the novel details of construction and combinations of parts more fully hereinafter disclosed and particularly pointed out in the appended claims.

Referring to the accompanying drawing forming a part of this specification in which like numerals designate like parts in all the views:—

Figure 1 is a front elevational view of a hand truck with the present invention applied thereto, and Figure 2 is a central vertical sectional view of the parts shown in Fig. 1, the elevating attachment being shown in full lines in its normal position and in broken lines in the position which it assumes when lifting the load.

In the said drawings the numeral 5 designates the side frame members of a hand truck which are suitably connected by the transverse members 6 and provided with the rounded handle portions 7. all as will be clear from the drawings. The side frame members 5 are mounted upon an axle 8 which rotatably carries the truck wheels 9, whereby the vehicle may be moved over the surface of the floor or ground in the well known manner. The side members 5 have secured to them metallic straps 10 which preferably extend from a point adjacent the lower ends of the handle portions 7, downwardly to the lower ends of the said frame members 5 where they are bent outwardly to form the angularly disposed U-shaped extension or toe 11. Suitable guards 12 may be secured to the said metallic straps 10 over the wheels 9, as clearly shown in Fig. 1, and the frame members 5 may be further provided with the feet or supports 13. (See Fig. 2.)

The construction thus far described may be the usual and well known construction commonly employed in trucks of this type, which construction has the disadvantage that when the load, such as box, bale and the like, is placed on the toe 11 in order to swing the truck backwardly to move the said toe upward to disengage it from the surface over which the truck must travel, it is necessary that the wheels 9 be prevented from revolving, while at the same time a relatively large force must be applied to the handles to lift the load.

In order to overcome this difficulty, I have provided a means which may be attached to the truck construction, above described, whereby the load may be readily lifted and the truck moved to a more nearly horizontal position without the expenditure of a large amount of energy, while at the same time the movement of the truck over the floor upon its wheel is prevented.

The attachment comprising this invention preferably consists of a U-shaped lever 15 which is pivotally secured at 16 to the frame members 5. To the lower extremities of the said lever 15 are pivoted one end of the link members 17, the other ends of which are pivotally connected at 18 to one end of the horizontally disposed raising levers 19, which are pivoted at 20 to the lower ends of the frame members 5. The said levers 19 are provided with the extensions 21, extending into the cut-away portion of the U-shaped extension 11, which is rigidly carried by the frame members 5, as is clearly shown in Fig. 2.

Coiled tension springs 23 are interposed between the upper arms of the U-shaped lever 15 and the side frame members 5 and normally tend to hold the said U-shaped lever in its full line position indicated in Figures 1 and 2. In order to further assist in maintaining the said lever in such position the spring clips or catches 24 may be provided for yieldingly engaging the arms of the said lever to maintain them in the said full line position.

In use the truck being in the full line position indicated in Fig. 2, the load is placed thereon in the usual manner, resting upon the toe or extension 11. When it is desired to lower the rear end of the truck, as indicated by the broken lines, thus raising the load, it is only necessary for the operator to place his foot upon the transverse portion of the U-shaped lever, pressing it downward and thereby causing it to move about its pivots 16, as will be readily apparent. This movement causes the lower portions of the said lever to rise, carrying with them the links 17 which, in turn, cause the horizontally disposed levers 19 to move in a counter clockwise direction, as seen in Fig. 2, about their pivots 20. The extreme ends 21 of the said levers will bear on the floor or other surface thereby causing the toe 11 of the truck to be forced upwardly and the whole truck to pivot around its axle 8 to assume the broken line position indicated in Fig. 2. This movement, of course, shifts the center of gravity of the load, moving it backward and more over the axle, thereby making it comparatively easy to start the truck.

During this lifting and tilting action movement of the truck over the floor or surface has of course, been prevented due to the engagement of the lever extensions 21, but as soon as the tilting of the truck is accomplished the foot is removed from the lever 15, which immediately returns to its initial position under the influence of the tension springs 23. The arms of the said lever 15 snap past the spring catches 24, which serve to retain them in inoperative position, as will be readily apparent.

It will thus be seen that this invention provides a simple, inexpensive and effective means for accomplishing the desired results as above pointed out, and one which may be readily applied to either new trucks, or to those which are already in use.

While one specific embodiment of the invention has been illustrated and described, it is obvious that those skilled in the art may vary the details of construction as well as the arrangement of parts without departing from the spirit of the invention, and therefore, it is not wished to be limited to the above disclosure except as may be required by the claims.

What is claimed is:—

1. In a hand truck, the combination with a frame comprising spaced side members, supporting wheels therefor, and a load engaging angular extension rigid with said side members, of levers pivotally secured to said side members, adjacent said extension provided with portions adapted to engage and fulcrum upon the surface upon which said truck rests, whereby said load engaging extension may be raised; and means comprising a foot lever pivoted to said frame and link connections for moving said first mentioned levers about their pivots to produce said fulcruming and raising action.

2. In a hand truck, the combination with a frame comprising spaced side members, supporting wheels therefor, and a load engaging angular extension rigid with said side members, of levers pivotally secured to said side members, adjacent said extension provided with portions adapted to engage and fulcrum upon the surface upon which said truck rests, whereby said load engaging extension may be raised; means comprising a foot lever pivoted to said frame and link connections for moving said first mentioned levers about their pivots to produce said fulcruming and raising action; spring means for returning said foot lever to its inoperative position; and resilient catches carried by said frame for yieldingly maintaining said lever in said inoperative position.

In testimony whereof I affix my signature.

BURNS. W. BRITTON.